United States Patent [19]

Fowler et al.

[11] Patent Number: 4,949,749

[45] Date of Patent: Aug. 21, 1990

[54] SAFETY VALVES AND CONTROL APPARATUS FOR UNDERGROUND STORAGE FACILITIES

[75] Inventors: Joe R. Fowler, Spring; Robert J. Pirkle, Jr., Missouri City, both of Tex.

[73] Assignee: Safety Services, Inc., Houston, Tex.

[21] Appl. No.: 315,814

[22] Filed: Feb. 27, 1989

[51] Int. Cl.$^5$ ............................................ B65G 5/00
[52] U.S. Cl. .................................. 137/236.1; 405/59; 251/62
[58] Field of Search ................. 405/59, 53; 137/236.1; 251/62

[56] References Cited

U.S. PATENT DOCUMENTS

| | | | |
|---|---|---|---|
| 2,938,383 | 5/1960 | Blackburn | 73/304 |
| 2,981,071 | 4/1961 | Brandt | 405/53 |
| 3,056,265 | 10/1962 | Swinney | 61/0.5 |
| 3,068,884 | 12/1962 | Naul et al. | 137/172 |
| 3,490,240 | 1/1970 | Preston | 61/0.5 |
| 4,117,684 | 10/1978 | Hendrix | 405/54 |
| 4,392,354 | 7/1983 | Schwarzenbach | 60/727 |

*Primary Examiner*—Alan Cohan
*Attorney, Agent, or Firm*—Edward L. Jensen

[57] ABSTRACT

Safety valves and control apparatus for generally inaccessible fluid storage facilities wherein a closure mechanism may be attached to an access conduit at an accessible control location and inserted with the conduit into the storage facilities, which closure mechanism may be actuated by control mechanism from the accessible control location to open or close the access conduit at the remote storage facilities to permit or interrupt fluid flow, respectively. In an underground storage reservoir with access facilities including an outer casing and an inner conduit, separate closure mechanisms may be attached to the inner conduit and inserted therewith along and within the casing to the reservoir, and may be actuated independently to open or close the annulus between the outer casing and inner conduit, and the inner conduit, to thereby control fluid flow in either or both, as desired.

12 Claims, 3 Drawing Sheets

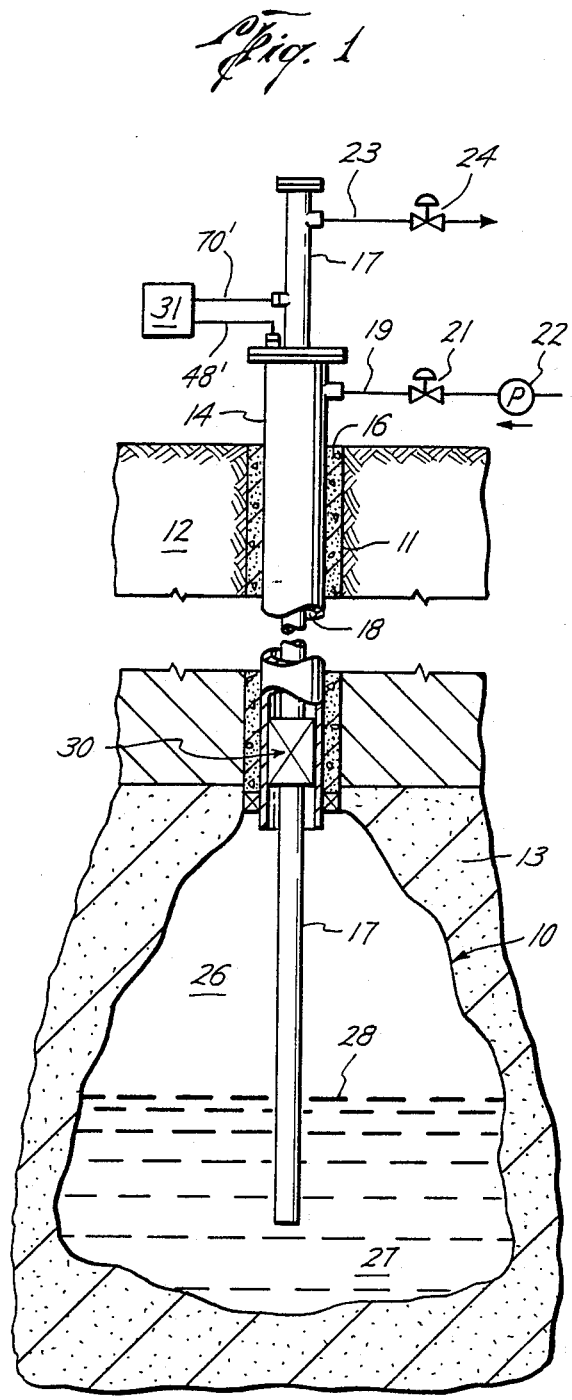
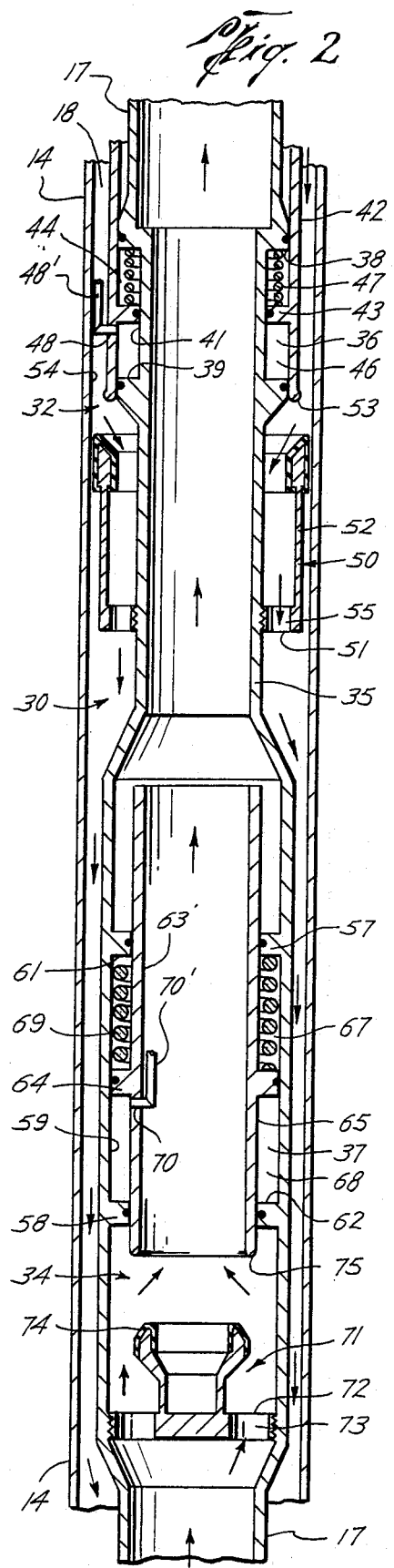

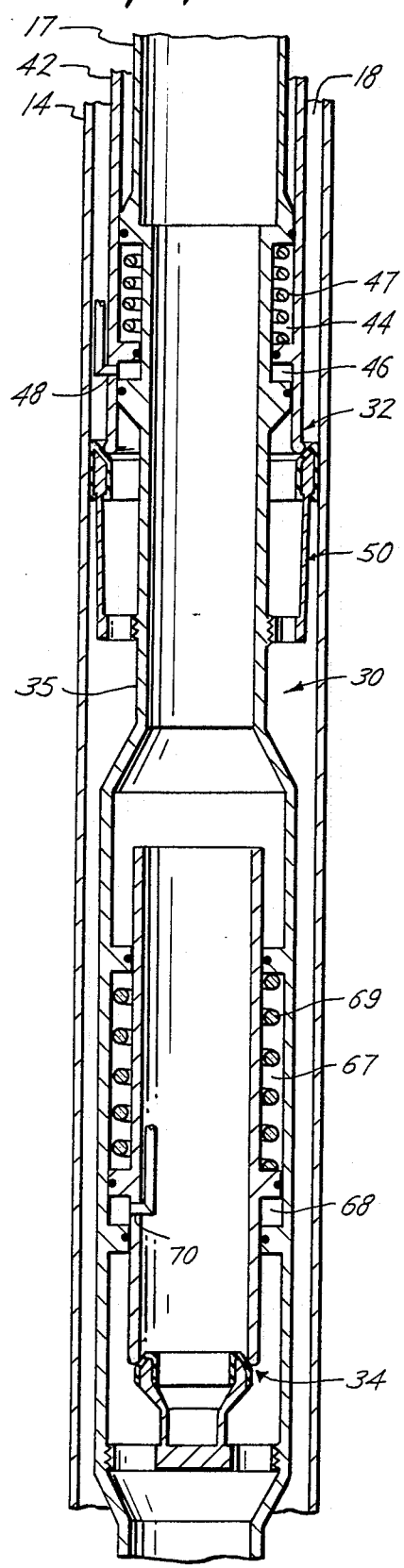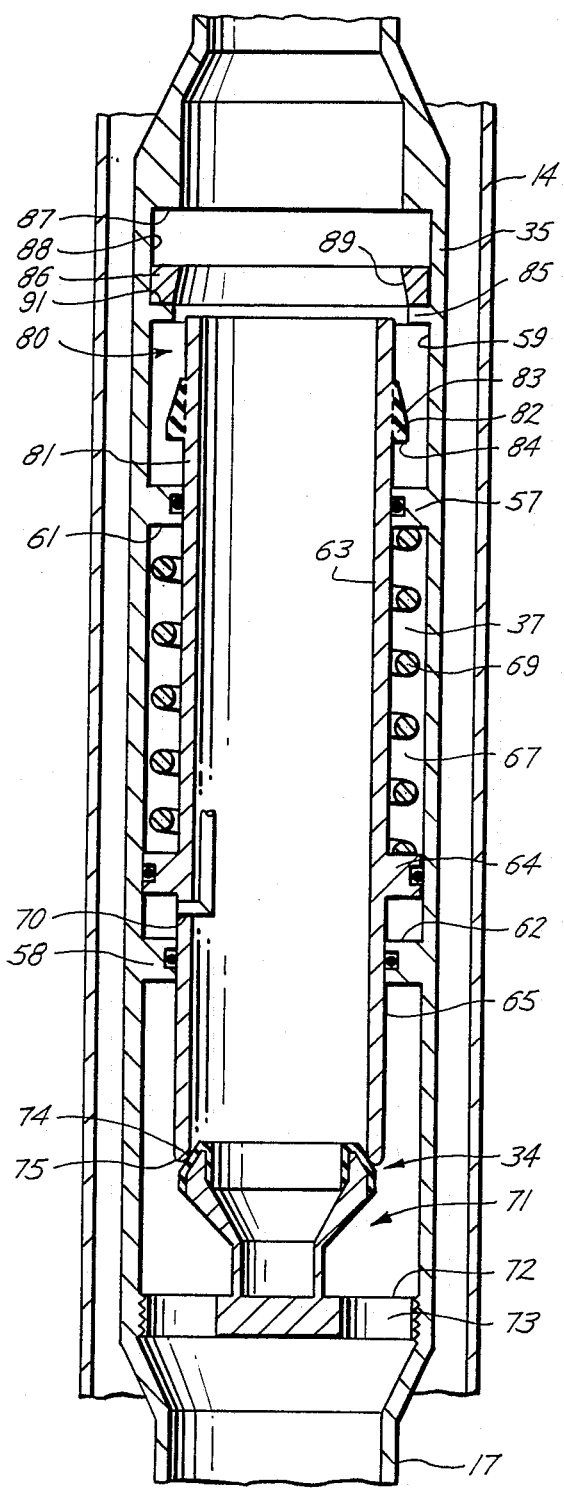

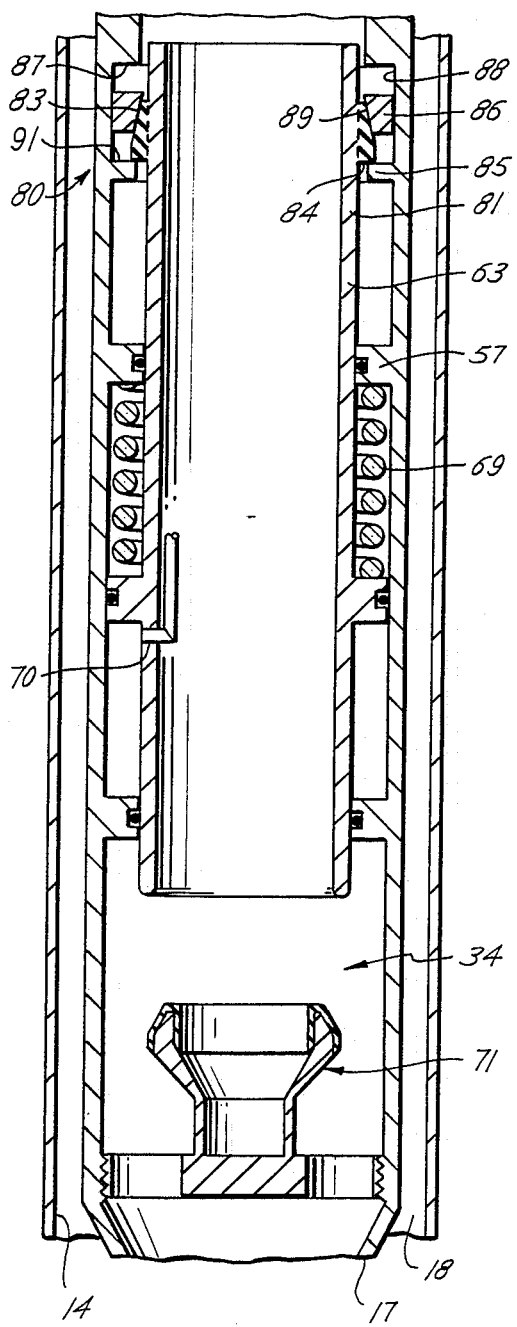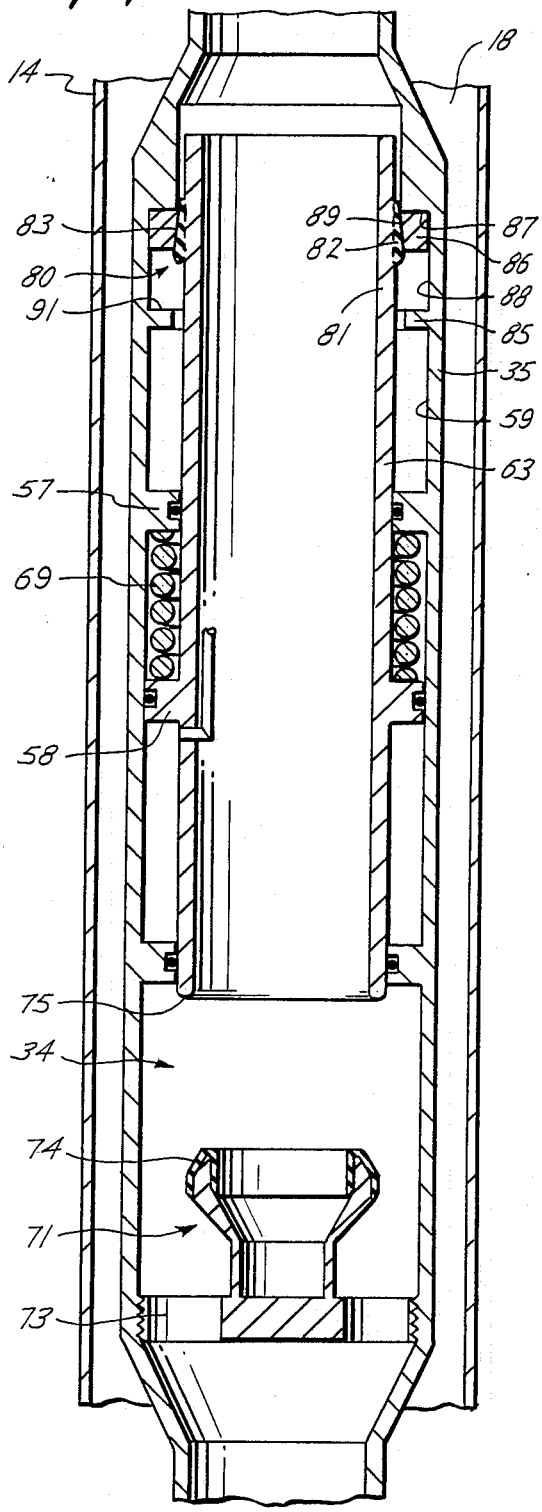

SAFETY VALVES AND CONTROL APPARATUS FOR UNDERGROUND STORAGE FACILITIES

The present invention relates generally to safety valves for remote storage facilities for fluids, and more particularly to apparatus for controlling fluid flow in underground storage caverns for liquid hydrocarbons or liquified petroleum gas.

The demand for fluids in ever-increasing quantities for production and consumption in this country and elsewhere has created a definite problem in providing suitable storage facilities for these fluids. Large reservoirs are often required in generally remote and sometimes inaccessible locations, which reservoirs must nonetheless have access facilities for injecting and discharging the fluids, capable of preserving the integrity of a given fluid and containing any leakage. It is an object of the present invention to provide safety valves in remote storage facilities for fluids, which valves are capable of arresting injection and/or discharge of the fluid, facilitating tests for leakage, preserving the integrity of the fluids and containing any leakage, all at the remote storage facility.

A classic example of such remote storage facilities can be found in the petroleum industries where the problem of storage of liquid hydrocarbons and liquified petroleum gas is particularly acute, due to the high cost of surface storage equipment, such as steel tanks, and due to the sturdy construction required to withstand the substantial vapor pressure of such liquids and concomitant risk of fire or explosion. This problem is exacerbated by the fact that many such industries experience seasonal fluctuations in their storage requirements—i.e. alternating peak loads and slack periods. The peak load periods, of course, necessitate large storage facilities, which compounds the problems of cost, stability and hazardous volatility, causing these industries to turn to underground storage caverns. It is a further object of the invention to provide control apparatus for underground storage caverns.

Underground storage caverns have proven especially valuable in the storage of L.P.G. (liquid petroleum gas). Such caverns are generally formed in impervious geological formations either by conventional mining methods, or in some cases, by dissolving out a soluble material in the formation with an aqueous solvent to create a storage space, as for example, in a salt dome. The resulting cavern is less expensive to provide than would be an equal volume of convenional surface storage space. These caverns are generally located hundreds or even thousands of feet below the surface of the ground in regions which are inaccessible for observation and control. The access bore is, of course, relatively small in diameter, and the cavern is very large and generally irregular in shape, thus complicating the problem. It is therefore a further object of the invention to provide control apparatus for underground storage caverns, which apparatus is operative to control the flow of fluids underground, notwithstanding the aforementioned inaccessibility, small access bore and the complicating problems of size and shape of the cavern.

The instant invention finds particular application in those storage caverns created in undergound salt formations by drilling an access bore from the surface down into a salt formation, and then washing out the salt by circulating fresh water down one conduit in the access bore to dissolve the salt, while continuously removing the resulting brine through another conduit in the access bore. The storage cavern is generally constructed with a surface casing cemented to the ground around the access bore from the surface to the top of the cavern, and a second conduit installed inside the surface casing and extending to the bottom of the cavern. During storage, a pool of brine or another suitable displacing medium is maintained in the bottom of the cavern and is discharged or replenished as product is added or removed, respectively. The system works because the displacing medium and stored product are each immiscible iri the other, and for example, the density differential between brine and the hydrocarbons causes the hydrocarbons to float on top of the brine.

For several years now L.P.G. and other light liquid hydrocarbons, e.g. gasoline, have been satisfactorily stored in this manner in such underground storage caverns. In operation, the L.P.G. is injected under pressure into the top of the cavern through the annulus of the surface casing, and the brine solution in the bottom of the cavern is expelled by displacement through the brine pipe, which normally extends concentrically up through the surface casing. Brine leaving the cavern ordinarily is passed to a filter tank and thence to a surface reservoir. If a leak were to develop in the brine pipe above the interface between the L.P.G. and the brine, the stream of brine leaving the cavern would carry with it considerable L.P.G. Any L.P.G. accompanying the brine will separate therefrom in the filter tank and be wasted. This is particularly undesirable when the filter tank is located in an industrial area such as an oil refinery wherein the L.P.G. may be ignited, or worse yet, exploded. Obviously, the risk of a fire or explosion hazard is magnified greatly if the brine solution is expelled directly into a holding tank or reservoir—i.e. no filter tank.

Similarly, such a leak in the brine pipe would result in contamination of the L.P.G. with brine solution, requiring at the very least costly separation and processing, and at worst, loss of the contaminated L.P.G. An additional problem arises when two or more storage caverns are operated in the same vicinity, using the same brine as the controlling medium for both cavities. For example, brine expelled from a cavity being filled with butane may be passed directly into a second cavity containing propane, for example, to expell the propane from the second cavity. Any butane accompanying the brine leaving the first cavity would contaminate the propane in the second cavity, and vice-versa, and valuable product would be lost.

Yet another and equally important problem is caused if a leak were to develop in the surface casing itself. This would allow leakage of the L.P.G. into the surrounding surface structure and ground waters. Such leakage again results not only in the loss of valuable product, but also contaminates the adjoining land and creates a substantial fire and explosion hazard.

A more specific object of the invention is therefore to provide control apparatus for an underground storage cavern for storing liquid hydrocarbons, which control apparatus allows the flow of fluids to be interrupted at a remote point below the surface, preferrably at or closely above the top of the cavern, to permit testing of the integrity of the casing and brine pipe, and to allow repair or replacement of the string of casing and/or brine pipe, as required. It is still another specific object of the invention to provide control apparatus for underground storage caverns for liquid hydrocarbons, which apparatus allows the flow of all fluids to be completely shut off at or near the top of the cavern, upon discovery of a leak, to prevent further contamination or loss of product, to eliminate contamination of the surrounding structure and surface water, and to curtail the resulting fire and/or explosion hazard.

In accordance with another aspect of the present invention, a control apparatus is provided in an underground storage facility wherein a first conduit connects the surface to the top of an underground storage facility and a second conduit extends from the surface to or near the bottom of the underground facility, which control apparatus includes mechanism arranged in at least one of the conduits beneath the surface, and is capable of being activated from above-ground to close and seal off the flow of fluid in the corresponding conduit. Another feature of the invention is to provide control apparatus of the type described, wherein the closure mechanism is normally held in a closed position sealing off the flow of fluids, thereby rendering the apparatus fail safe. A further feature of the invention is to provide such control apparatus wherein the closure mechanism minimizes the pressure drop or restriction of flow when actuated to an open or flow-permitting position so as to not impede or interfere unduly with the injection or discharge of fluids to or from the reservoir when desired.

Further aspects and features of the invention will become apparent from the following summary description of one specific embodiment of the invention. This particular embodiment contemplates a control apparatus for use in an underground storage system wherein a cavern is formed in a salt dome, connected to the surface through an access bore by first conduit or surface casing generally cemented to the structure around the access bore and extending down from the surface to the top of the cavern. A second conduit or brine pipe is arranged concentrically within the surface casing and extends down from the surface to or near the bottom of the cavern. A brine solution is utilized as the control medium and product is injected into or discharged from the cavern through the annulus formed between the surface casing and brine pipe while the brine solution is conversely discharged or injected through the brine pipe. The control apparatus of the invention enables the flow of fluids to be controlled from the surface yet interrupted at a remote point far beneath the surface. Such apparatus may include a first mechanism arranged in the annulus of the surface casing at a point immediately above the top of the cavern and responsive to an actuating control located at the surface to seal off fluid flow in the annulus; a second mechanism arranged in the second conduit or brine pipe also at point immediately above the top of the cavern and similarly but independently responsive to the actuating control to seal off fluid flow in the brine pipe; wherein the above-ground actuating control is capable of selectively causing the first and second mechanisms, or either of them, independently or together, to become operative to close and thereby seal off fluid flow respectively in the annulus of the casing, or the brine pipe, or both.

In a further refinement of the invention, the first and second mechanisms are normally biased to a closed or sealing-off position, and each requires positive actuation from the surface control in order to open and permit fluid flow in the corresponding annulus of the casing or the brine pipe, respectively, thus providing a fail safe control apparatus which automatically closes and seals off all fluid flow if the energizing medium for the above-ground actuating control is interrupted for any reason.

In many underground storage facilities of this description, demand for fluid flow is almost constant as product is repeatedly and alternately withdrawn from and injected into the reservoir. In such cases, particularly with control apparatus of the above design wherein the fail safe feature requires positive and continuous actuation by the above-ground control to cause the first and second closure mechanisms to open and permit fluid flow in the annulus of the casing and the brine pipe, respectively, it may be desirable to have further mechanism for locking the first and second mechanisms in an open or flow permitting position during reservoir operation so that the above-ground actuating control does not require continuous energization. In this manner, once the first and second closure mechanisms are opened by the actuating control, the lock-up mechanism may be activated to hold the respective closure mechanisms open and the actuating control may be de-energized to conserve energy without interrupting fluid flow.

Yet another feature of the invention, in combination with the control apparatus described, is therefore to provide a lock-up mechanism for each of said first and second closure mechanisms. In a preferred embodiment, the lock-up mechanism requires no additional energization, but is activated by the simple actuation of the respective closure mechanism by the actuation control, and which lock-up mechanism is activated thereby to lock-up the respective closure mechanism in an open or fluid-flow position so that the actuating control may be de-energized without interrupting the flow of fluid in the corresponding annulus or brine pipe. A further refinement of this feature contemplates a lock-up mechanism wherein the lock-up mechanism is released by the mere re-actuation of the first or second closure mechanisms by the above-ground actuation control to un-lock the mechanism and allow the said first or second closure mechanism to return to its normal, fail-safe closed position, thereby to shut off fluid flow and seal the corresponding annulus or brine pipe.

The foregoing and other objects and features of the invention will become more apparent from the following detailed description, claims and drawings, in which:

FIG. 1 is a schematic elevational view in partial section of a typical underground storage cavern provided with the necessary appurtenances for utilization of the control apparatus of the present invention;

FIG. 2 is an enlarged, cross-sectional view of a preferred embodiment of a downhole safety valve in accordance with the invention, shown as an attachment to the brine pipe located concentrically within the surface casing of the underground storage cavern illustrated in FIG. 1, the safety valve being depicted in an open or actuated position to permit fluid flow in both the annulus of the casing and within the brine pipe;

FIG. 3 is a similarly enlarged, cross-sectional view of the preferred downhole safety valve shown in FIG. 2, depicted here in an un-actuated or normal closed condition sealing off fluid flow in the annulus of the surface casing and in the brine pipe;

FIG. 4 is a partial view, also in cross-section, of the preferred downhole safety valve shown in FIGS. 2 and 3, depicting a refinement in which the central valve is provided with a lock-up mechanism, the lock-up mechanism being shown here in an un-locked condition;

FIG. 5 is a partial view similar to that in FIG. 4, depicting the lock-up mechanism in a locked condition following actuation of the central valve when the above-ground control is energized to a first set point; and FIG. 6 is again a partial view similar to that in FIG. 4, depicting the lock-up mechanism in a released condition following actuation of the central valve when the above-ground control is energized to a second set point, in preparation for returning the valve to a closed or sealing condition upon de-energization of the above-ground control.

Referring now to the drawings and specifically FIG. 1, a sealed underground storage cavern generally designated 10 is illustrated. This cavern 10 can be formed by various conventional methods well known in the art. For example, a vertical access bore 11 may be drilled from the surface through various overlying formations 12, such as surface soil, shale, limestone, sandstone, and the like, into a soluble impermeable formation 13, such as a salt formation or salt dome, and this soluble formation will generally have a layer of cap rock above it, such as anhydrite or gypsum. The access bore preferably penetrates the impermeable formation to or near the ultimate depth of the cavern to be subsequently formed. After the access bore 11 has been completed, a casing 14 is set in the borehole and cemented at 16 to the surrounding formation above the impermeable formation 13, generally between the surface and the aforesaid cap rock, so as to form a fluid-tight seal against the leakage of fluids past the casing and to securely anchor said casing. An eductor or wash pipe 17, may then be fed into the casing 14, generally in concentric spaced relationship thereto, thereby forming an annulus 18, until the lower end of the pipe 17 extends beneath the lower end of casing 14, preferably to or near the bottom of the access bore.

To form the cavern, a solvent, such as fresh water, is pumped down annulus 18 into the impermeable formation 13, and the resulting solution formed by the washing operation, such as brine, is removed via pipe 17. During the formation of the cavern, inner pipe 17 can be moved vertically up and down, and the circulation of the fluid in the borehole and the cavern can occasionally be reversed, in order to facilitate the washing operation. The cavern 10 resulting from the washing operation will often have an irregular shape, such as that shown in the drawing, due to the manner of circulation, presence of shale stringers, or imbedded insoluble material such as gypsum. Alternatively, the cavern can have a regular shape, such as an inverted or upright cone, or can be in the shape of a cylinder. Once the cavern is formed, the upper end of casing 14 may be provided with a product inlet line 19 connected to a flow control valve 21, such as an air operated motor valve, and a suitable pump 22. The upper end of the wash pipe 17, on the other hand, may be provided with a brine withdrawal line 23 connected to a similar valve 24 and communicating with a brine pond or surface reservoir. The casing 14 is capped around the wash pipe 17 to stabilize the wash pipe and to seal the annulus.

When it is desired to prepare the completed underground storage cavern for storage of product, such as gasoline, butane, ethane, propane, ethylene or other light hydrocarbons (hereinafter, "L.P.G."), the cavern 10 and the wash pipe 17, now called a brine pipe, are first filled with brine. The L.P.G. is then pumped via conduit 19 into the upper end of the annulus 18 and through the annulus into the cavern 10, the resulting stored L.P.G. 26 being immiscible and lighter than the pool of brine 27, and therefore floats on top of the brine and forms a distinct interface therewith. As the L.P.G. 26 fills in the cavern, the brine 27 is displaced upwardly to the surface via brine pipe 17 and then conveyed via line 23 to the brine pond or surface reservoir. During this operation, the interface 28 is progressively lowered and approaches the lower open end of brine pipe 17.

It is evident from the foregoing description that any leak in the system would be devastating. Corrosion or other deterioration of the eductor or brine pipe 17 could cause a hole resulting in contamination of the L.P.G. stream in the annulus 18 of the surface casing 14 and/or the brine solution in eductor pipe 17, and in consequence, the contamination and loss of valuable L.P.G. and the creation of a dangerous fire or explosion hazard. Also, corrosion or other deterioration of the surface casing 14 could cause a hole, resulting in the leakage of L.P.G. into the surface structure and ground water surrounding the casing and/or the introduction of foreign matter into the L.P.G. stream. The consequences in this case are contamination of the surrounding earth structure and ground water, as well as the contamination or loss of valuable L.P.G., and again the creation of a dangerous fire or explosion hazard.

Pursuant to one specific embodiment of the present invention, a subsurface control or downhole safety valve, indicated generally at 30, is installed immediately above the cavern 10 shown in FIG. 1, and is controllable from the surface by an actuating device 31 connected mechanically, electrically, pneumatically or hydraulically to the valve. Valve 30 is designed generally to seal off the annulus 18 between the surface casing 14 and brine pipe 17, and/or separately to seal off the brine pipe 17 itself. In a preferred embodiment, illustrated in cross-section in FIG. 2, the downhole safety valve 30 is a unitary, combination valve designed to preserve the integrity of the separate fluid flows both in the annulus 18 and in the brine pipe 17, and to effectively seal off one or both of said respective fluid flows, independently, when desired. The valve 30 is mounted or attached to and interrupts the eductor or brine pipe 17, and is inserted with the string of brine pipe 17 into the surface casing 14 so as to be positioned at a depth immediately above the cavern 10.

To this end, the downhole safety valve 30 of the preferred embodiment includes two separate annular piston and cylinder arrangements—one arrangement for the annulus 18 of the casing 14 and the other arrangement for the brine pipe 17—each being actuated hydraulically and independently by the above-ground actuating device 31. The aboveground actuating device 31 may consist of a hydraulic control, well known in the industry, with connecting lines strapped or otherwise attached to the brine pipe 17 and in separate communication with each piston and cylinder arrangement.

More specifically, the downhole safety valve 30 of the preferred design is composed of two closure sections, an annulus valve indicated generally at 32 and in communication exclusively with the annulus 18 between the casing 14 and the brine pipe 17, and a central valve indicated generally at 34 and in communication exclusively with the brine pipe 17. Though viewed in cross section in FIG. 2, it will be appreciated that valve 30 is generally cylindrical in configuration having a tabular body 35 fabricated with an exterior cylinder or chamber 36 for the annulus valve 32 and an interior cylinder or chamber 37 for the central valve 34.

In the annulus valve 32, the exterior chamber 36 is defined in part by shoulders 38 and 39 and cylinder wall 41 of a channel configured in tube 35. An annular piston 42, cylindrical and hollow in shape, forms a sleeve closely fitted around tube 35 at shoulders 38 and 39 and the inner wall of piston 42 completes the exterior chamber 36. Annular piston 42 is slidable longitudinally along tube 35, except that a continuous interior rib or ridge 43 is constructed on the inner wall of piston 42 so as to extend into chamber 36 and abut cylinder wall 41, thereby forming a plunger coacting with the chamber 36 so as to be responsive to hydraulic pressure from the actuating device 31 and limiting the sliding movement of piston 42 to travel between shoulders 38 and 39. Thus, rib 43 divides the chamber 36 into an upper portion 44 and a lower portion 46, and a suitable spring such as helical spring 47 may be inserted in the upper portion 44 of chamber 36 so as to coact with shoulder 38 and rib 43 to bias the piston 42 toward a lowermost or shut off position and thereby to resist hydraulic pressure applied in the lower portion 46 of chamber 36. Lower portion 46 of the chamber 36 may be in communication with and responsive to above-ground actuating device 31 by constructing a port in the tube 35 or piston 42 and connecting the hydraulic lines to the port—shown here as port 48 constructed in piston 42 below rib 43 and in communication with a corresponding hydraulic line 48' suitably connected thereto.

The sealing or closure function of the annulus valve 32 is accomplished by a sealing member 50 fashioned at least in part of a resilient, flexible or deformable material and attached to or constructed on the exterior of tube 35 so as to be capable of deflection or deformation between the inner wall of casing 14 and the outer wall of tube 35 to seal off flow in the annulus 18. As shown here, sealing member 50 is mounted or constructed on the exterior of tube 35 and consists of an annular base 51 provided with a cylindrical skirt or series of fingers 52—52 extending upwardly and longitudinally along tube 35 in opposing relationship to a camming surface or cam 53 constructed on the lower end of piston 42. The skirt or fingers 52—52 must be fabricated of resilient, flexible or deformable material inherently capable of being deformed or deflected and then springing back or returning to its original shape and/or position. The skirt or fingers 52—52 and the camming surface or cam 53 are dimensioned and configured so that when piston 42 is displaced downwardly, the camming surface or cam 53 engages the skirt or fingers 52—52 and deforms and/or deflects the latter against the interior wall 54 of the casing 14 to form a seal and close off the flow of fluids in the annulus 18.

With this particular design, it was found beneficial to perforate the annular base 51 with a series of spaced holes 55—55 because the base obviously obstructs fluid flow in the annulus 18 even when the annulus valve 32 is open, and the holes significantly reduce the restriction of flow and the corresponding pressure drop across the valve. Also, in this preferred embodiment of the invention, the cylindrical skirt or fingers 52—52 may be fabricated of resilient or deformable material, as suggested above, or simply encapsulated or coated with an elastomer such as natural or synthetic rubber or plastic. In fact, as shown, the cylindrical skirt or fingers 52—52 may be formed of a resilient metal and may be encapsulated only around the upper edge or tips with a resilient or deformable material. Any number of resilient or deformable materials may be suitably pliable and elastic, such as styrene, cold rubber, nitrile, neoprene, butyl thiokal, phenolics, xitron, teflon, flourocarbons and many others.

Turning now to FIG. 3, the annulus valve 32 is shown in a closed or sealing position, and in order to understand the operation of the annulus valve 32, one must appreciate that the valve is normally held in this closed or sealing condition due to the action of helical spring 47 against rib 43 forcing piston 42 and annular cam 53 downwardly to engage and deform or deflect cylindrical skirt or fingers 52—52 against the interior wall 54 of the casing 14, thus forming a fluid-tight seal in the annulus 18. When hydraulic pressure is applied by the above-ground control device 31 to the lower portion 46 of chamber 36, piston 42 is forced upwardly against the bias of spring 47 to the position shown in FIG. 2 again, thus to release the cylindrical skirt or fingers 52—52 from deformation or deflection and thereby allow fluid flow in the annulus 18 between the interior wall 54 of casing 14 and the skirt or fingers 52—52, and between the cam 53 on piston 42 and the skirt or fingers 52—52.

For the central valve 34 in this preferred embodiment, as best shown in FIG. 2 again, two ridges or lands 57 and 58 are formed or constructed on the interior surface 59 of tube 35 and are spaced apart longitudinally therein. The interior cylinder or chamber 37 is defined by shoulder 61 of land 57 and shoulder 62 of land 58, together with interior surface or cylinder wall 59 of the tube 35. A second annular piston 63 is provided within tube 35, which piston is cylindrical in shape, hollow and open at both ends, and is dimensionally compatible with lands 57 and 58 so as to fit closely therewithin and be slidable therealong longitudinally of tube 35. An exterior rib 64 is constructed on the outer surface 65 of piston 63, and the piston is installed within tube 35 so that rib 64 is positioned between lands 57 and 58 and thereby limits the travel of piston 63. This rib 64 is also dimensionally compatible with chamber 37 and abuts the interior surface or cylinder wall 59 of tube 35 in sealing relationship, and thereby forms a plunger coacting with cylinder or chamber 37 so as to be responsive to hydraulic pressure from device 31. In this case, rib 64 divides chamber 37 into an upper portion 67 and a lower portion 68, completed and contained by the exterior surface 65 of annular piston 63. A helical spring 69 may be inserted in the upper portion 67 of chamber 37 so as to coact with shoulder 61 of land 57 and rib 64 to bias the piston 63 toward a lowermost or sealing position and thereby to resist hydraulic pressure applied to the lower portion 68 of chamber 37. The lower portion 68 of chamber 37 may be in communication with and responsive to the above-ground hydraulic control device 31 by constructing a suitable port or ports in the tube 35 or piston 63 connected to the hydraulic lines, shown here as port 70 constructed in piston 63 below rib 64 and in communication with a corresponding hydraulic line 70' suitably connected thereto.

The sealing or closure function of the central valve 34 is accomplished by a sealing member 71 constructed or mounted in the interior of tube 35 in spaced relationship below land 58 and the lower end of piston 63. Sealing member 71 may consist of a plate 72 mounted in tube 35 and extending across the interior thereof, perpendicular to the axis of the tube, and fabricated with multiple, circumferentially spaced holes 73—73 to permit fluid flow. A continuous cylindrical skirt or wall 74 are further constructed or mounted on the upper surface of plate 72 and extend upwardly and longitudinally along the interior of tube 35 in apposing relationship to a camming surface or cam 75 constructed or mounted on the lower end of piston 63. The cylindrical skirt or wall 74 are dimensioned and positioned so as to be radially inside all of the holes 73—73 and in spaced relationship below piston 63.

At least one of the cylindrical skirt or wall 74 or the camming surface or cam 75 must be fabricated of or coated with a resilient, flexible or deformable material inherently capable of being deformed or deflected and then springing back or returning to its original shape and/or position. The skirt or wall 74 and the camming surface or cam 75 are deminsioned and configured so that when piston 63 is displaced downwardly, the camming surface or cam 75 engages the skirt or wall 74 deforms and/or deflects the deformable or flexible material sufficiently to form a seal and close off flow of fluids within tube 35 and therefore in the brine pipe 17. It should be noted that the skirt or wall 74 need not be fashioned with the same configuration or design as the skirt or fingers 52—52 of the annulus valve 32. In fact, as shown in FIG. 2, there is a considerable difference in the configuration or design of skirt or wall 74 of the preferred embodiment as compared to skirt or fingers 52—52.

In this particular design, it was also found beneficial to provide large holes 73—73 closely spaced in plate 72 because the plate obviously impedes fluid flow and the design objective is to minimize the restriction of flow in the brine pipe 17 and thereby reduce the corresponding pressure drop across the central valve 34 as much as possible. Also, in this preferred embodiment, the camming surface or cam 75 at the lower end of piston 63 and at least the upper rim or ends of the cylindrical skirt or wall 74 are fabricated of, or encapsulated or coated with, a resilient, flexible or deformable material such as natural or synthetic rubber, plastic or any of the materials as previously discussed.

Turning again to FIG. 3, the central valve 34 is also shown in its normally closed or sealing position due to the action of helical spring 69 against rib 64 forcing piston 63 downwardly so that the camming surface or cam 75 at its lower end engages the upper rim or ends of the cylindrical skirt or wall 74 and deforms or deflects the elastomer or resilient material on one or both sufficiently to form a seal between the piston and the skirt or wall, thus closing off flow within tube 35 through holes 73—73 and sealing the brine pipe 17. When hydraulic pressure is applied to the lower portion 68 of cylinder or chamber 37 by the above-ground control device 31, piston 63 is forced upwardly against the resistance of spring 69 to separate the camming surface or cam 75 from the cylindrical skirt or wall 74, therby to permit fluid flow between them and through the holes 73—73, and thus to allow fluid flow within tube 35 and the brine pipe 17.

It should be noted that although the unitary construction of valve 30 has been adopted in this preferred embodiment, the annulus valve 32 and central valve 34 could be separately constructed as individual units and located at different levels or depths along the brine pipe 17 downhole. For example, the annulus valve 32 could be located immediately above the cavern 10 as shown, but the central valve 34 could be located at the bottom of the brine pipe 17 to allow testing of the integrity of the brine pipe against leaks along its entire length. In the preferred installation, how ever, variations in the level of the interface between the stored L.P.G. and the brine solution, as product is being injected or removed make it desirable to locate both valves immediately above the cavern.

In certain installations where the demand for fluid flow is almost constant, a further refinement of the downhole safety valve described above may include a lock-up mechanism, indicated generally at 80 in FIG. 4, which is designed to hold either or both of the annulus valve 32 and central valve 34 in an opened condition, once actuated. Although FIG. 4 depicts such a lock-up mechanism for the central valve 34 only, a similar lock-up mechanism may be employed for the annulus valve 32 as well, and indeed that is the case in the preferred embodiment of the invention. Such lock-up mechanisms are particularly important in downhole installations for underground storage caverns to allow the annulus valve 32 and/or the control valve 34 to be inserted into the casing 14 while in the open position so that fluid can flow freely through the valves as the unit is lowered into position.

With reference to FIG. 4 for an illustration of such a lock-up mechanism 80, the second annular piston 63 is fabricated so that a portion 81 extends beyond land 57 and is provided with latch 82. Latch 82 may be annular in configuration and mounted on the outer circumference of annular piston 63, as in the preferred embodiment shown, so that it remains in fixed relationship longitudinally of the piston, but is tapered radially to form a wedge 83 which is collapsable or may be deflected inwardly at its outermost edge, radially of the piston, yet normally presents an exposed shoulder 84. This deflection may be allowed by constructing the latch 82 of a resilient material which may be deflected or deformed and will inherently return to or resume its original shape or position, such as the spring action of an expansion ring, tapered as shown, and capable of being deflected or deformed at its outmost edge to a lesser diameter. Many other devices well known in the art may be utilized to achieve the same purpose or result, but in this embodiment, the essential features are that the latch be tapered and that it be capable of inward deflection or deformation at its outermost edge.

Latch 82 cooperates with a stop 85, formed in this case as a land constructed on the interior wall 59 of tube 35 above land 57 and the interior cylinder 37, the latch 82 being normally in spaced relationship in alignment below the stop 85. This embodiment of the lock-up mechanism 80 also includes collar 86 and a second stop 87, also formed as a land constructed on the interior wall 59 of tube 35 and in spaced relationship above the first stop 85 to form a slot or channel 88. Collar 84 is arranged within channel 88 and is freely slidable therein along the corresponding portion of interior wall 59 between first stop 85 and second stop 87, said collar having an outer diameter compatible with the inner diameter of that portion of the interior wall. Collar 86 is further fabricated with an interior taper 89 which is compatible with the taper of wedge 83 on latch 82 so that collar 86 may receive latch 82 and the corresponding tapers will be complementary at a self-locking angle.

In operation, since central valve 34 is biased by spring 69 to a normally closed position, as shown in FIG. 4, latch 82 is normally spaced below stop 85, and collar 86 will normally rest on an upper shoulder 91 of the first stop 85. As the central valve 34 is actuated by energizing the above-ground control 31 to a first set point, the valve assumes the position depicted in FIG. 5, in which spring 69 is compressed as piston 63 slides upward, forcing the latch 82 past the first stop 85. The interior diameter of land 57 is dimensionally compatible with the progressively increasing diameter of the wedge 83 of the latch 82 so that the wedge is depressed or deformed slightly as it passes by the stop 85, and then expands again to permit shoulder 84 thereof to catch on the upper shoulder 92 of that stop 85. During this same motion of the piston 63, the collar 86 is engaged by wedge 83 and slides up freely in channel 88 without resistance. The actuator control 31 may then be de-energized and the central valve 34 is now locked in an open position permitting fluid flow in the brine pipe 17 and the valve may be left in this condition for as long as desired. Thus, the lock-up feature allows energy to be conserved since the actuator control no longer requires continuous energization as would other wise be the case without the lock-up mechanism.

To release the lock-up mechanism 80 and allow central valve 34 to return to its normally closed condition, the above-ground actuator control 31 is energized to a second set point, again actuating the valve, but this time compressing spring 69 further as piston 63 slides upward beyond the lock-up position, forcing latch 82 to drive collar 86 along channel 88 and against the second stop 87 to drive the wedge 83 into a selflocking condition with the interior taper of the collar 86, as shown now in FIG. 6. The length of travel of the piston 63, and the dimensions of the interior taper of the collar 86 and the complementary taper of the wedge 83, are designed to depress or deform the wedge sufficiently to reduce its outer dimensions to a diameter less than that of the first stop 85. The actuator control 31 may then be deenergized again and the spring 69 will force piston 63 to slide back down again to the normally closed position of the central valve 34. This is permitted at this time because the latch 82 and collar 86 are locked together by the self-locking angle of the interior taper of the collar and the wedge 83, and the latch is depressed inwardly of and passes by the first stop 85. However, as the latch 82 passes the first stop 85, the collar 86 is engaged by the upper shoulder 91 of this stop and pushed back along the latch 82 and disengaged from the wedge 83. The central valve 34 has thus been returned to its normally closed position and the lock-up mechanism 80 is again ready for operation.

It will be evident to one skilled in the art that a similar lock-up mechanism may be provided for the annulus valve 32, as was done in the preferred embodiment of the present invention. In this case, however, it is preferred that the latch be mounted on the exterior surface of the tube 35 above shoulder 38. Similarly, it is preferred that the first and second stops be mounted or fashioned in the interior surface of annular piston 42 on a portion extending above shoulder 38, and defining a channel for the collar. Because of the inversion of the latch and stops, though the motion of piston 42 is still upward, the same as annular piston 63, the relative positions of the first and second stop is reversed (i.e., the first stop is located above the second stop) and the complementary tapers of the interior of the collar and the wedge on the latch must also be reversed in direction (i.e., the wedge must increase in diameter and the interior taper of the collar must decrease in diameter, in the upward direction). In all other respects, the latch, stops and collar must be dimensionally and spatially compatible in the same manner as illustrated above, albeit inverted and reversed.

In operation, latch 82 would remain stationary and the first stop would move with piston 63 past the latch, depressing or deforming the wedge slightly as it passes over, after which the wedge expands and locks up against the lowermost shoulder of the first stop. The collar is driven upward freely in the channel between the first and second stops as before. When the lock-up mechanism is released by energizing the control device 31 to the second set point, the piston 63 is driven further upward and the second stop forces the collar up onto the latch to engage and compress the wedge in self-locking relationship so that the latch may now pass within and past the first stop again when the actuator control is de-energized again. As before, the collar engages the first stop again and is pulled free of the wedge on the latch, and the annulus valve has been returned to its normally closed position with the lock-up mechanism ready for action again.

It will further be appreciated by one skilled in the art that though an annular latch 82 is shown in the foregoing preferred embodiment, an equivalent would include one or more separate latches 82—82 arranged like splines in a plane perpendicular to the axis of the annular piston 63 and located at one or more points around the circumference of the accommodating surface, and each latch 82 would cooperate with a corresponding dimensionally and spatially compatible stop 85 and a complementary self-locking wedge or collar 84 to operate essentially in the same manner.

It will be apparent from the foregoing description that, although one preferred embodiment and certain specific refinements have been described in detail, various modification and other refinements may be made without departing from the spirit and the scope of the invention.

Thus, while a preferred embodiment, with several refinements, and various alternate embodiments have been shown and described in detail in the foregoing specification and accompanying drawings, the invention is not limited thereto, but may be otherwise variously embodied and practiced within the scope of the appended claims.

What is claimed is:

1. In a remote storage facility for fluids, including a reservoir which is generally inaccessible and capable of containing fluids, and access facilities for injection and discharge of fluids to and from the reservoir from an accessible control location, including a first access conduit in communication with the reservoir and a second access conduit capable of fitting within the first access conduit and being inserted into the reservoir from the accessible control location by feeding the second access conduit into and along the first access conduit; the improvement of control apparatus for interrupting fluid flow in the access facilities at or near the inaccessible reservoir comprising first closure means mounted on the second access conduit at the accessible control location and capable of fitting within the first access conduit so as to be fed with the second conduit into and along the first conduit to a remote location at or near the reservoir yet still within the first conduit, said first closure means being capable of being selectively actuated to permit or interrupt fluid flow in the annulus between the first and second conduits; second closure means mounted to the second access conduit at the accessible control location and capable of fitting within the first access conduit so as to be fed with the second conduit into and along the first conduit to a remote location near, at or within the reservoir, said second closure means being capable of being selectively actuated to permit or interrupt fluid flow within the second access conduit; and actuating means located at the accessible control location and capable of selectively actuating said first or second closure means, or both, to permit or interrupt fluid flow in the corresponding first or second access conduit, as desired.

2. The control apparatus as claimed in claim 1, wherein the first and second closure means are incorporated into a complex conduit section which is attachable to the second access conduit and capable of fitting within the first access conduit, said complex conduit section having a wall defining two separate passages including an annulus passage communicating exclusively with the annulus between the first and second access conduits, and a core passage communicating exclusively with the second access conduit; wherein the first closure means are installed in the annulus passage of said complex conduit section and may be selectively actuated to open or close off fluid flow in the annulus passage and thereby to permit or interrupt fluid flow in the annulus between the first and second access conduits; and wherein the second closure means are installed in the core passage of said complex conduit section and may be selectively actuated to open or close off fluid flow in the core passage and thereby to permit or interrupt fluid flow in the second access conduit.

3. The control apparatus as claimed in claim 1, wherein first means are provided for biasing the first closure means normally to one of the flow permitting or flow interrupting conditions, said first biasing means being overcome by actuation of the first closure means by the actuating means to assume the other condition; and wherein second means are provided for biasing the second closure means normally to one of the flow permitting or flow interrupting conditions, said second biasing means being overcome by actuation of the second closure means by the actuating means to assume the other condition.

4. The control apparatus as claimed in claim 1, wherein first means are provided for biasing the first closure means normally to a closed condition interrupting fluid flow in the annulus between the first and second access conduits, said first biasing means being overcome by the positive actuation of the first closure means by the actuating means so that the first closure means assumes an open condition allowing fluid flow in the annulus only so long as the first closure means remains actuated; and wherein second means are provided for biasing the second closure means normally to a closed condition interrupting fluid flow in the second access conduit, said second biasing means being overcome by the positive actuation of the second closure means by the actuating means so that the second closure means assumes an open condition allowing fluid flow in the second access conduit only so long as the second closure means remains actuated, thereby rendering the control apparatus fail safe.

5. The control apparatus as claimed in claim 4, wherein first means are provided for locking up the first closure means in the open condition once actuated by the actuating means, thereby allowing the actuating means to be de-energized without allowing the first biasing means to return the first closure means to the normally closed condition; wherein first means are provided for selectively releasing said first lock-up means to allow the first biasing means to return the first closure means to the normally closed condition, as desired; and wherein second means are provided for locking up the second closure means in the open condition once actuated by the actuating means, thereby allowing the actuating means to be deenergized without allowing the second biasing means to return the second closure means to the normally closed condition; and wherein second means are provided for selectively releasing said second lock-up means to allow the second biasing means to return the second closure means to the normally closed condition, as desired.

6. The control apparatus as claimed in claim 1, wherein the first closure means comprises a first annular sealing member mounted on the second access conduit and extending into the annulus between the first and second access conduits, said first annular sealing member having at least an annular extremity formed of resilient material capable of being deformed or deflected, a first annular cam mounted on the second access conduit in opposing relationship to the annular extremety of said first sealing member, at least one of said first annular sealing member and said first annular cam being movable toward and away from the other, and first drive means responsive to the actuating means for causing relative movement between said first annular sealing member and said first annular cam, said first annular sealing member and said first annular cam being so configured and positioned relative to each other that upon movement of one toward the other, said first annular cam engages and deforms or deflects the annular extremity of said first annular sealing member against adjacent portions of the interior wall of the first access conduit to close off and seal the annulus against fluid flow, and upon movement of one of said first annular sealing member and said first annular cam away from the other, said first annular cam disengages from said first annular sealing member to allow said first annular sealing member to resume its normal shape and position and to open the annulus and permit fluid flow; and wherein the second closure means comprises a second annular sealing member mounted to the second access conduit and extending into the second access conduit, a second annular cam mounted to the second access conduit in opposing relationship to said second annular sealing member, at least one of said second annular sealing member and said second annular cam being movable toward and away from the other, and at least one of said second annular sealing member or said second annular cam having at least a mating annular extremity formed of resilient material capable of being deformed or deflected, and second drive means responsive to the actuating means for causing relative movement between said second annular sealing member and said second annular cam, said second annular sealing member and said second annular cam being so configured and positioned relative to each other that upon movement of one toward the other, said second annular cam engages said second sealing member and deforms or deflects the annular extremity of resilient material sufficiently to close off and interrupt fluid flow in the second access conduit, and upon movement of one of said second annular sealing member and said second annular cam away from the other, said second annular cam disengages from said second annular sealing member to allow the annular extremity of resilient material to resume its normal shape and position, and to open the second access conduit and permit fluid flow.

7. The control apparatus as claimed in claim 6, wherein the first and second drive means each comprises an annular cylinder mounted on the second access conduit, an annular piston arranged with said annular cylinder to respond to fluid pressure and to be movable relative to said annular cylinder longitudinally of the second access conduit; wherein the actuating means comprises means for applying fluid pressure to each of said annular cylinders and said annular pistons to drive said annular pistons in at least one longitudinal direction relative to said annular cylinders, each of said annular pistons being connected to a corresponding one of the annular sealing members or annular cams to cause relative movement between that annular sealing member and annular cam; and wherein means are provided for biasing each of said annular pistons in opposition to the fluid pressure in the corresponding annular cylinder, said biasing means being arranged to bias each of said pistons normally to a position in which the corresponding annular sealing member and annular cam are in one of two relative positions, engaged or disengaged.

8. The control apparatus as claimed in claim 7, wherein each of the biasing means is arranged to bias the corresponding piston in the direction necessary to cause the associated annular sealing member and annular cam to be normally engaged and close off fluid flow; wherein separate means are provided for locking up each of the pistons once driven by the fluid pressure means relative to the annular cylinder to disengage the associated annular cam from the annular sealing member and for holding the corresponding piston with the associated annular cam and the annular sealing member in a fluid flow permitting position, thereby allowing the fluid pressure means to be de-energized without allowing the associated biasing means to return the corresponding piston to its normal position closing off fluid flow; and wherein separate means are provided for selectively releasing each of said lock-up means and permitting the corresponding annular piston to return to its normal position in which the associated annular cam engages and deforms or deflects the annular extremity of the associated sealing member to close off and seal against fluid flow when the fluid pressure means is deenergized.

9. In a remote storage facility for fluids, including a reservoir which is generally inaccessible and capable of containing fluids, and an access conduit which may be inserted into the reservoir from an accessible control location to establish communication therebetween for injection and discharge of fluids to and from the reservoir; the improvement of a safety valve for arresting injection and/or discharge of the fluids at or near the inaccessible reservoir, comprising a closure means mounted on the access conduit at the accessible control location and inserted with the access conduit to a remote location at or near the otherwise inaccessible reservoir as the access conduit is inserted into the reservoir; actuating means located at the accessible control location and capable of selectively actuating said closure means to open or close to permit or interrupt fluid flow in the access conduit; said closure means comprising an annular sealing member mounted on the access conduit and extending into the conduit, said annular sealing member having at least an annular extremity formed of resilient material capable of being deformed or deflected, an annular cam mounted on the access conduit in opposing relationship to said annular extremity of said sealing member, at least one of said annular sealing member and said annular cam being movable toward and away from the other, and drive means responsive to the actuating means for causing relative movement between said annular sealing member and said annular cam, said annular sealing member and said annular cam being so configured and positioned relative to each other that upon movement of one of said annular sealing member and said annular cam toward the other, said annular cam engages and deforms or deflects the annular extremity of said sealing member sufficiently to close off and interrupt fluid flow in the access conduit, and upon movement of one of said annular sealing member and said annular cam away from the other, said annular cam disengages from the annular extremity of said sealing member to allow said annular sealing member to resume its normal shape and position, and to open the access conduit and permit fluid flow.

10. The safety valve as claimed in claim 9, wherein the drive means comprises an annular cylinder mounted on the access conduit, an annular piston arranged with said annular cylinder to respond to fluid pressure and movable relative to said annular cylinder longitudinally of the access conduit; and wherein the actuating means comprises means for applying fluid pressure to said annular cylinder and said annular piston to drive said annular piston in at least one direction relative to said annular cylinder, said annular piston being connected to one of the annular sealing member or annular cam to cause relative movement between the annular sealing member and the annular cam, and wherein means are provided for biasing said annular piston in opposition to the fluid pressure in the annular cylinder, said biasing means being arranged to bias said piston normally to a position in which the annular sealing member and annular cam are in one of two relative extreme positions, engaged or disengaged.

11. The safety valve as claimed in claim 10, wherein the biasing means is arranged to bias the piston so that the annular extremity of the sealing member and the annular cam are normally engaged and close off fluid flow in the access conduit; wherein means are provided for locking up the piston once driven by the fluid pressure means relative to the annular cylinder to disengage the annular cam from the annular sealing member, and to hold the piston in a position where the annular cam and the annular sealing member permit fluid flow in the access conduit, thereby allowing the fluid pressure means to be de-energized without allowing the biasing means to return the piston to its normal position closing off fluid flow; and wherein means are provided for selectively releasing said lock-up means and permitting the annular piston to return to its normal position in which the annular cam engages and deforms or deflects the annular extremity of the sealing member to close off and seal the access conduit against fluid flow when the fluid pressure means is de-energized.

12. In a remote storage facility for fluids, including a reservoir which is generally inaccessible and capable of containing fluids, and an access conduit which may be inserted into the reservoir from an accessible control location to establish communication therebetween for injection and discharge of fluids to and from the reservoir; the improvement of a safety valve for arresting injection and/or discharge of the fluids at or near the inaccessible reservoir, mounted on the access conduit at the accessible control location and inserted with the access conduit to a remote location at or near the otherwise inaccessible reservoir, comprising a closure means mounted on the acess conduit at the accessible control location and inserted with the access conduit to a remote location at or near the otherwise inaccessible reservoir as the access conduit is inserted into the reservoir, said closure means being capable of being actuated to open or close to permit or interrupt fluid flow in the access conduit; actuating means located at the accessible control location and capable of selectively actuating said closure means to open or close; biasing means for biasing said closure means normally to a closed condition interrupting fluid flow in the access conduit, said biasing means being overcome by the positive actuation of said closure means by the actuating means so that said closure means assumes an open condition allowing fluid flow in the access conduit; means for locking up the closure means in the open condition once actuated by the actuating means, thereby allowing the actuating means to be de-energized without allowing the biasing means to return the closure means to the normally closed condition; and means for selectively releasing said lock-up means to allow the biasing means to return the closure means to the normally closed condition when the actuating means is de-energized, as desired.

* * * * *